United States Patent [19]

Flowerdew et al.

[11] Patent Number: 4,812,812

[45] Date of Patent: Mar. 14, 1989

[54] APPARATUS AND METHOD FOR DETERMINING THE POSITION AND ORIENTATION OF A REMOTE OBJECT

[75] Inventors: Peter M. Flowerdew; Donald L. Hore, both of Bristol, United Kingdom

[73] Assignee: Gas Research Institute, Inc., Chicago, Ill.

[21] Appl. No.: 109,550

[22] Filed: Oct. 16, 1987

[51] Int. Cl.[4] .............................................. G01V 1/00
[52] U.S. Cl. .................................. 340/854; 324/247; 324/346
[58] Field of Search ............... 33/1 PT; 324/207, 346, 324/208, 247; 340/854

[56] References Cited

U.S. PATENT DOCUMENTS

| | | | |
|---|---|---|---|
| 3,800,213 | 3/1974 | Rorden | 324/247 |
| 3,868,565 | 2/1975 | Kuipers | 324/450 |
| 3,983,474 | 9/1976 | Kuipers | 324/207 |
| 4,054,881 | 10/1977 | Raab | 324/244 |
| 4,396,884 | 8/1983 | Constant. | |
| 4,584,577 | 4/1986 | Temple | 33/1 PT |
| 4,637,480 | 1/1987 | Obrecht et al. | 324/346 |
| 4,642,786 | 2/1987 | Hansen | 324/207 |
| 4,688,037 | 8/1987 | Kreig | 324/207 |

FOREIGN PATENT DOCUMENTS 0789929 12/1980 U.S.S.R.

*Primary Examiner*—Deborah L. Kyle
*Assistant Examiner*—John W. Eldred
*Attorney, Agent, or Firm*—Neal J. Mosely

[57] ABSTRACT

An apparatus and method for determining the position and orientation of a remote object in relation to an observation point comprises a transmitter for sending a magnetic field signal and a receiver for receiving and analyzing the magnetic field signal. The transmitter or the receiver is positioned at the observation point and the other is secured on the remote object. The transmitter has three coils positioned on a ferromagnetic core with their axes mutually orthogonal to each other and connected to a polyphase power to produce a magnetic field around the coils. The coils are connected and energized in pairs to produce a magnetic field rotating about the axis of the third coil. The receiver has three coils positioned on a ferromagnetic core with their axes mutually orthogonal to each other and responsive to the magnetic field produced by the tranmsitter. The receiving coils are connected in pairs to detect the phase relationship and magnitude of the signal to indicate the orientation of the remote body. The transmitter or receiver coils are preferably annular coils wound orthogonally on a homogeneous spherical ferromagnetic core, although other cores may be used such as a hollow cylindrical ferromagnetic core, a ferromagnetic rod core or a ferromagnetic disc core supported in a gimbal mounting with annular coils wound orthogonally thereon.

40 Claims, 4 Drawing Sheets

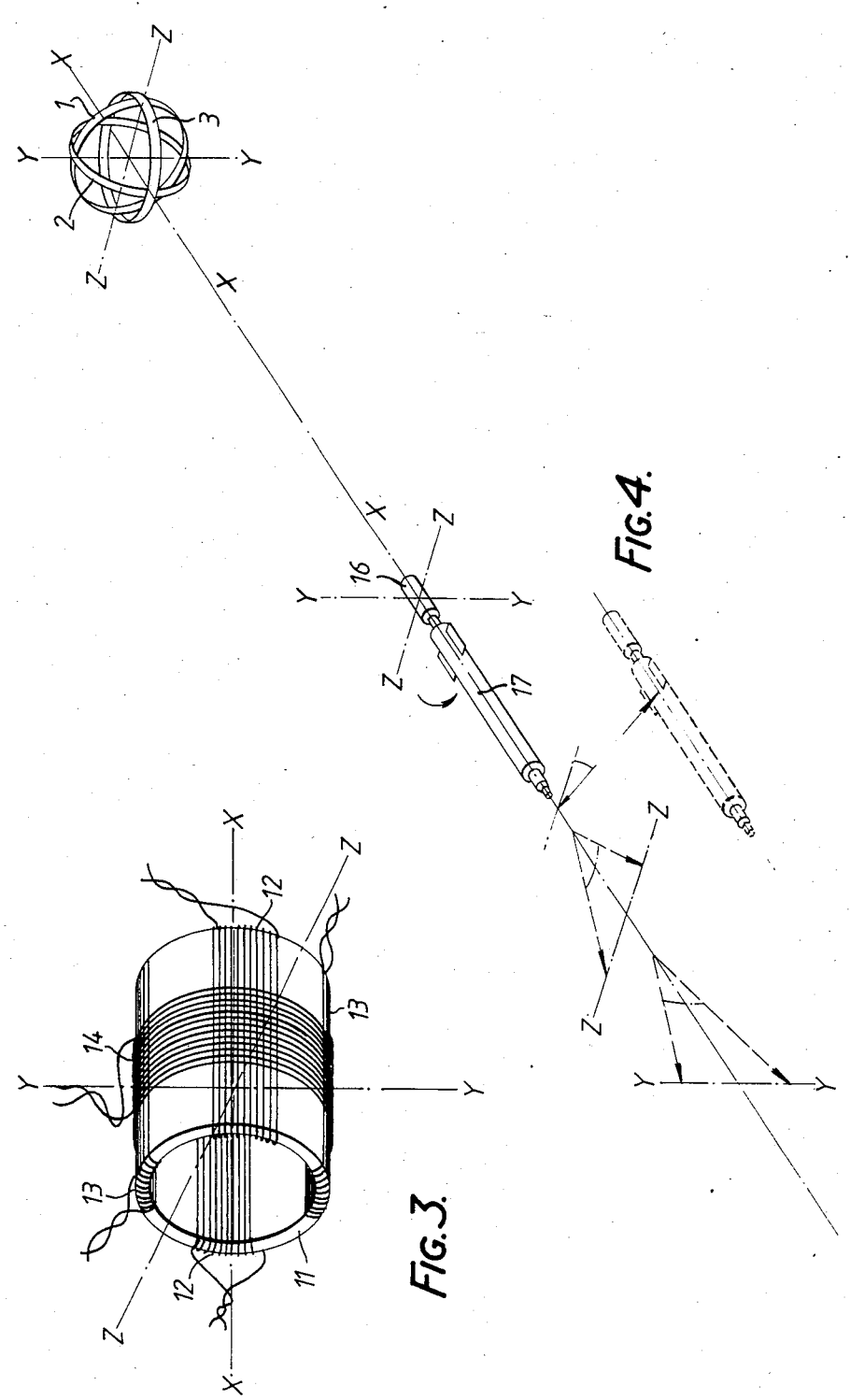

APPARATUS AND METHOD FOR DETERMINING THE POSITION AND ORIENTATION OF A REMOTE OBJECT

BACKGROUND OF THE INVENTION

Field of the Invention

This invention relates to new and useful improvements in method and apparatus for determining electrically the position and orientation of a remote object.

SUMMARY OF THE INVENTION

An apparatus and method for determining the position and orientation of a remote object in relation to an observation point comprises a transmitter for sending a magnetic field signal and a receiver for receiving and analyzing the magnetic field signal. The transmitter or the receiver is positioned at the observation point and the other is secured on the remote object. The transmitter has three coils positioned on a ferromagnetic core with their axes mutually orthogonal to each other and connected to a polyphase power to produce a magnetic field around the coils. The coils are connected and energized in pairs to produce a magnetic field rotating about the axis of the third coil. The receiver has three coils positioned on a ferromagnetic core with their axes mutually orthogonal to each other and respective to the magnetic field produced by the transmitter. The receiving coils are connected in pairs to detect the phase relationship and magnitude of the signal to indicate the orientation of the remote body. The transmitter or receiver coils are preferably annular coils wound orthogonally on a homogeneous spherical ferromagnetic core, although other cores may be used such as a hollow cylindrical ferromagnetic core, a ferromagnetic rod core or a ferromagnetic disc core supported in a gimbal mounting with annular coils wound orthogonally thereon.

BRIEF DESCRIPTION OF THE DRAWINGS

FIG. 3 is a perspective view of a receiver coil assembly suitable for mounting on an underground boring tool or "mole", FIG. 4 is a perspective view of a mole equipped with a receiver coil assembly of FIG. 3 and a remote transmitter coil assembly arranged to excite the coils on the mole for orientation purposes.

DESCRIPTION OF THE PREFERRED EMBODIMENTS

Figure 1:
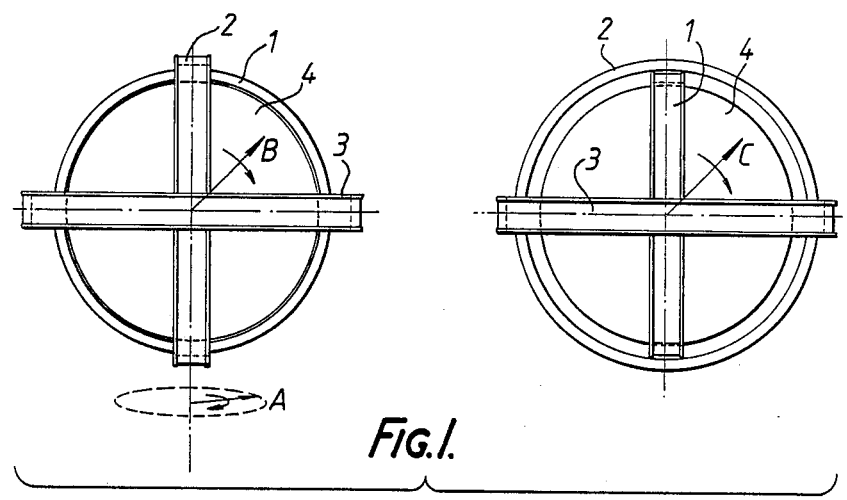
FIG. 1 shows side views of a coil assembly for producing rotating electromagnetic fields.

This invention is concerned with means for transmitting information about the relative positions in space of a transmitter and receiver, or of transmitter tilt relative to a gravity determined vertical. It has particular application to systems for measurement and/or guidance of the position and attitude of soil piercing or boring tools, but is by no means limited to such applications.

According to one aspect of the present invention there is provided a positioned information system comprising a transmitter for producing a varying electromagnetic field having a set of coils with three mutually orthogonal intersecting axes and means for energizing the coils in pairs with a.c. in a phase relationship that generates a resultant field rotative about the axis of the third coil, a receiver coil and means for determining from the receiver coil the phase relationship of the induced signal to the transmitted signals, and thereby providing an indication of the positional relationship between the coil and the transmitter.

Preferably, there are three receiver coils in a mutually orthogonal relationship similar to the transmitter, each contributing positional information derived from phase relationships. The transmitter coils may be energized in pairs in sequence, using the same frequency, or each pair may use a different frequency, allowing simultaneous transmission.

The coils are preferably annular and may be wound on formers around a spherical ferromagnetic core. However, in certain circumstances this configuration is not feasible, and may have to be verified. An example will be described, particularly applicable to underground boring devices.

According to another aspect of the present invention there is provided a positional information system comprising a transmitter for producing a varying electromagnetic field having a set of coils with three mutually orthogonal intersecting axes and means for energizing the coils in pairs with a phase relationship that generates a field rotative about the axis of the third coil, a magnetically susceptible body with a defined magnetic axis suspended in proximity to the transmitter, and means for determining from any coil the phase relationship of the signal induced therein by the other two coils and thereby provide an indication of the orientation of said body.

Preferably, the coils will be annular and wound on formers in the shape of a spherical cage. The body is then suspended symmetrically at the center point and the cage will be arranged so that one coil axis is normally vertical and coincident with the axis of the body. The latter may simply be a ferromagnetic rod, with a bias weight to hold it upright. Signals from the coils in receiver mode can be processed to indicate the tilt of the rod and its direction of inclination.

For a better understanding of the invention, some embodiments will now be described, by way of example, with reference to the accompanying drawings, in which:

The basic equipment is a set of three similar coils, 1, 2 and 3 with mutually orthogonal axes intersecting at a common center, these coils being excited in pairs with 2-phase alternating current to establish rotating electromagnetic fields about each of the three axes, either separately and in sequence at a common frequency, or simultaneously at different frequencies. The production of a rotating field by 2-phase windings is commonplace in a.c. motor technology and will not be described in detail. The coils 1, 2 and 3 are wound on formers fixed at right-angles to each other e.g. by adhesive, and if desired the fields they produce may be strengthened by incorporating a ferromagnetic core 4. This must be spherical and homogeneous if it is not to introduce variations in field intensity through variations in permeability in different directions, and may in practice by constructed of high permeability low conductivity material such as powdered iron or ferrite. The core would be omitted for applications in which the internal field is sensed, as described later.

Figure 2:
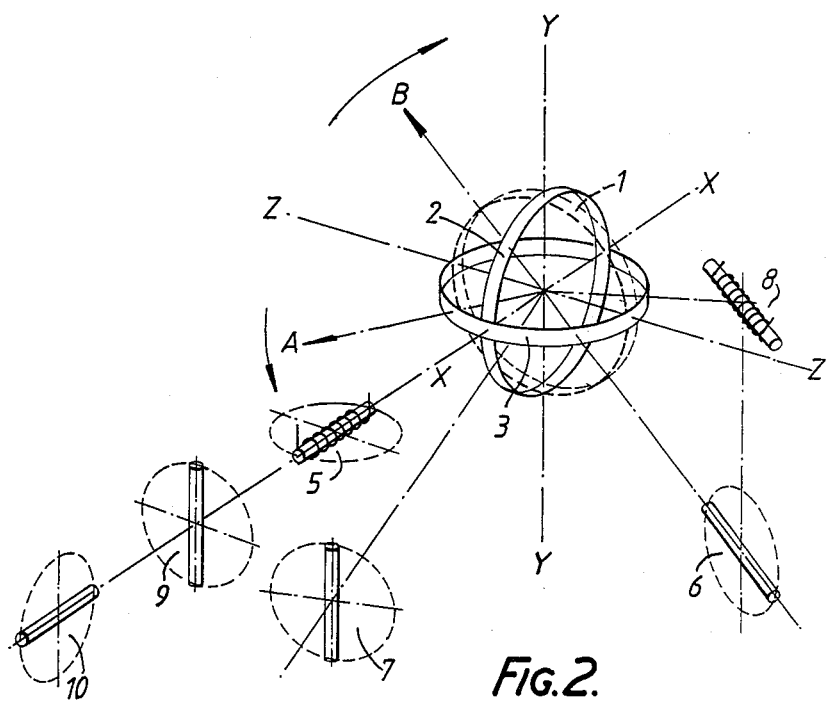
FIG. 2 is a diagrammatic perspective view of the coil assembly, with a sensor coil in various positions.

Referring now to FIG. 2 it will be apparent that exciting coils 1 and 2 only with 2-phase a.c. will produce a resultant field A rotating about the vertical axis Y of coil 3. Exciting coils 2 and 3 only will produce a resultant field B rotating about the horizontal axis X of coil 1, while exciting coils 3 and 1 only will produce a resultant flux C rotating about the horizontal axis Z axis of coil 2. In all cases the direction of rotation depends on the phase rotation.

For determination of the relative positions of this three-coil transmitter and a receiver, the external field is sensed. FIG. 2 illustrates the effect on an external search coil of exciting coils 1 and 2 only to produce the resultant field A rotating at supply frequency about the Y axis, and therefore of maximum amplitude in the horizontal place X-Z through the coil center.

At position 5 the search coil is initially aligned with the X axis. It is swept each cycle by resultant field A, with its signal peak amplitude corresponding in time to peak excitation of the coil 1, and a null corresponding to peak excitation of the coil 1. It will be apparent that if the search coil remains in the same plane pointing towards the coil center but is swung around to position 6, for example, its signal will still have the same amplitude, but will no longer be in phase with coil 1; the change of phase angle will correspond with the change in mechanical angle, because the field structure is equivalent to that of a 2-pole induction motor, in which electrical and mechanical degrees have the same values. But if the same search coil remains at position 5, but is rotated about its center in the horizontal plane, as suggested by the dotted circle, the signal will exhibit a similar phase change to that caused by swinging it around the coil. center, because its peak will always occur when the radial direction of the resultant flux A is parallel to the search coil. So, if it were possible to establish independently the radial position of the search coil about the transmitter center, the signal phase would establish the rotational attitude of the search coil axis to that radius. This shows one aspect of the system properties.

Consider again the search coil at position 6, initially radially aligned with the transmitter center in the horizontal plane, as indicated by the dotted line. It will be apparent that the signal will remain constant in phase but decrease in amplitude until the search coil is vertical, when a null point is reached. Rotation beyond this will produce a signal of opposite phase sense increasing in amplitude until the search coil is again horizontal 180' from its starting point. So, rotation in this plane produces a distinctive change in signal amplitude, with phase reversal at the 90' and 270' positions.

Having moved the search coil into the vertical position relative to the horizontal plane, when it will experience a null signal, consider the effect of rotating it about the radial axis as indicated at position 7. Its signal amplitude will increase from null at the vertical position to reach a maximum when horizontal, with a further null and phase reversal at 180'.

In each case considered, there is a mathematical relationship between the phase and amplitude of the signal at the search coil and the latter's position and attitude relative to the transmitter. Trigonometrical formulae can be established covering the case in which the measurements are restricted to movements in the horizontal plane about the transmitter center.

If the plane in which the search coil is moved is now lifted e.g. to point 8, it will be clear that the signal amplitude will reduce because the new plane is no longer coincident with the X-Z plane in which the peak occurs. Otherwise its response will vary in a similar manner to a coil in that the X-Z plane, and excitation of coils 1 and 2, but mathematically predictable.

It will be understood that excitation of coils 3 and 1 to produce resultant field C rotating about the Z axis will also produce mathematically definable signals at the various possible positions of the search coil. Because these differ with the axis of field rotation, it is possible to obtain three sets of information about the relative positions and attitudes of a three-coil transmitter and a single search coil.

If a receiver is used which effectively incorporates three aerials on mutually orthogonal axes, the amount of positional information which can be derived from the rotating fields is greatly increased. Such an aerial may be constructed in similar fashion to the transmitter. Where the situation does not allow for a solid core, as for example behind a soil piercing tool or mole, for which fluid power and control cable access is required, a toroidal core design may be used, similar to that described in our previous application No. 8610972, but wound with coils serving three axes. One example of this is illustrated schematically in FIG. 3.

The core is typically a spirally wound toroid of suitable steel 11. Taking its longitudinal axis as X, its vertical axis as Y and its horizontal axis as Z, it is possible to use all this core material in common to provide enhanced coupling of a.c. electromagnetic fields to three windings on these three axes. A pair of toroidally wound coils 12 disposed diametrically opposite one another across the horizontal diameter and connected in series will respond to a.c. field components on the vertical axis Y, and a similar pair 13 on the vertical diameter will sense a.c. field components on the horizontal axis Z. A coil 14 wound co-axially around the outside of the toroid will detect a.c. field components along the axis X. The annular construction allows for central passage of pipes and cables when a 3-axis aerial of this form is attached to the back of a soil piercing tool.

FIG. 4 illustrates a 3-axis transmitter 15 as shown in FIGS. 1 and 2 and an aerial 16 as shown in FIG. 3 applied to position and attitude sensing of a soil piercing mole 17 below ground. The transmitter and receiver electrical power supplies and electronic systems for data retrieval and display are not shown, as these utilize conventional techniques familiar to electronic engineers. The transmitter 15 is positioned below ground in an access pit in line with the projected hole to be bored, but accurately sited for verticality and direction.

If the mole 17 is steerable by remote control, it is vital that its roll attitude (rotation about longitudinal axis X) is established s that the steering elements operates in the correct direction. It will be apparent that, if the transmitter 15 has 2-phase a.c. applied to coils 2 and 3 to give resultant field B rotating about the X axis, the signal detected by the Y axis coil 12 of the receive will have a phase relationship relative to the transmitter frequency which is directly related to roll angle. This can be related to the FIG. 2 search coil at position 9. The same would also be true for the signal from the receiver Z axis coils 13, but shifted 90' in phase. There should be a null signal from the receiver longitudinal X axis coil 14 as long as the mole and its receiver remain on that axis.

If the transmitter coils 3 and 1 are energized to produce resultant field C rotating about the horizontal Z axis of the transmitter, the receiver X axis coil signal 5 will have a phase relationship with the transmitter frequency which will change with pitch of the mole and receiver.

The system is therefore capable of detecting roll, pitch and yaw from phase angle measurements, but it will be obvious that, as pitch and yaw angle increase towards 90', the phase change effects will pass from one receiver axis to another. By comparing the signals on each axis, which must still follow mathematically predictable relationships, it is possible to establish by use of all three axes of transmission not only roll, pitch and yaw, but also the coordinate position of the receiver relative to that established when the transmitter was sited, taking into account any off-axis displacement of the transmitter. With a steerable mole, the system may be used to obtain positional information to enable it to be steered along a predetermined course.

The three axes of the transmitter may be energized sequentially at the same frequency or simultaneously at different frequencies, filtering of the receiver signals being then used to discriminate between the three axes. Because three sets of information are available for each receiver axis, the system provides for continuous cross-checking of the positional data through suitable computer hardware.

Figure 5:
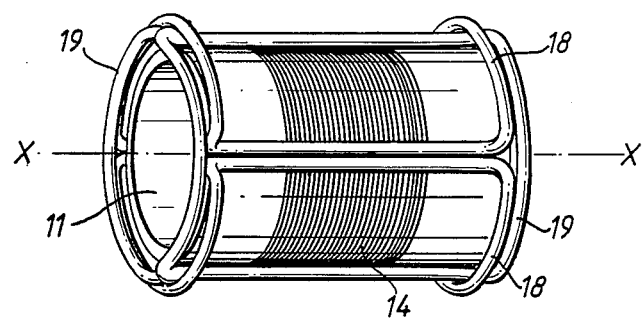
FIG. 5 is a perspective view of an alternative receiver coil assembly.
Figure 6:
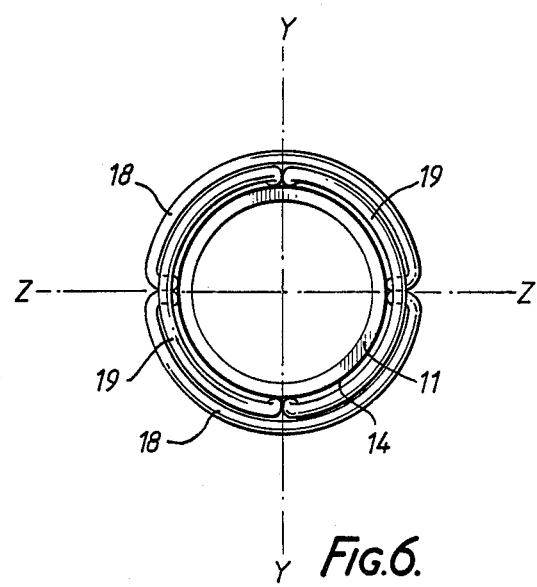
FIG. 6 is an end view of the assembly of FIG. 5, and, FIG. 7, 8 and 9 are diagrammatic perspective views of a tilt sensor employing the three coil assembly of FIG. 1.

A possibly more practical toroidal transmitter is illustrated in FIGS. 5 and 6, where the core 11 and coil 14 are as in FIG. 3. However, instead of winding coils 12 and 13 in laborious fashion by taking turns through the core, they are replaced by wholly external coils 18 and 19. These are constructed as rectangular, former wound coils held to the core by straps (not shown) or other means and the series connected pairs are arranged in mutually orthogonal relationship. They are similar to induction motor windings for a two pole stator, except that the 'stator° in this case is inside out and slotless. Apart from simpler construction, inter-winding coupling should be minimized.

Figure 8:
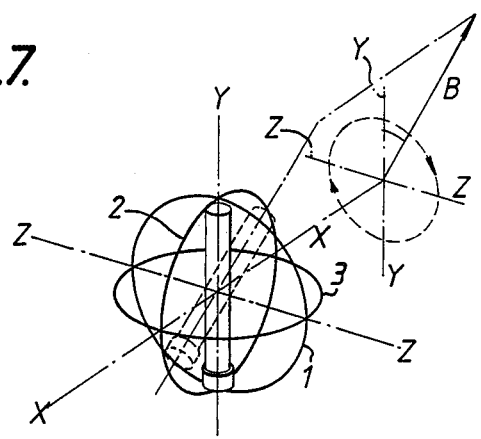
Figure 9:
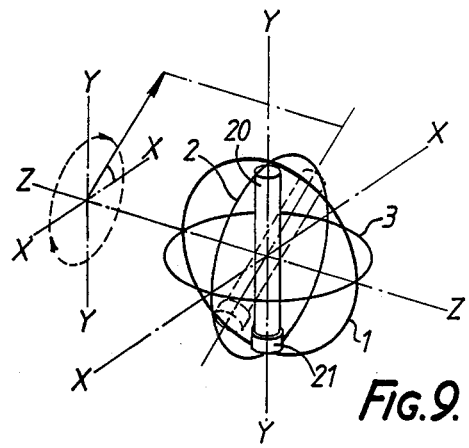

The foregoing description has covered typical techniques for sensing the external field of the transmitter, and applying information to relative position sensing of transmitter and receiver. Another application of the 3-axis transmitter is to tilt sensing, when its internal field is sensed, and FIGS. 7, 8 and 9 illustrate this.

The same transmitter coil configuration is used, but the solid ferromagnetic core is omitted. Instead, a ferromagnetic rod 20, preferably of ferrite, is suspended about the coil center by a gimbal mounting, for example, so that it is free to pivot in any direction.

The rod 20 is provided with a weight 21 so that it maintains itself vertical by gravitational force. It is drawn in full in its datum or reference position aligned with the Y axis, and in broken lines displaced from this reference position by an arbitrary amount. Although for convenience the coils are drawn remaining in their original attitudes, it will be appreciated that the displaced position of the rod 20 represents the situation produced when the coil Y axis tilts from vertical, but the rod remains vertical.

Figure 7:
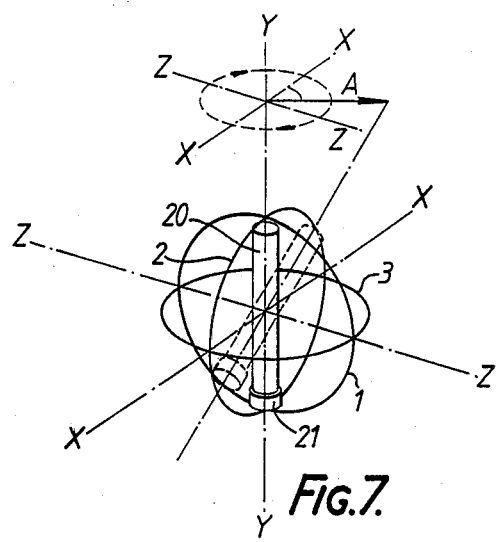

In FIG. 7, the coils 1 and 2 are energized with 2-phase a.c. to produce resultant field A rotating about the Y axis. If the emf induced in coil 3 is sensed, it will be found to have a null signal with the rod vertical, because there is no component of rotating field A along the rod axis. However,, at this point there is maximum coupling between the rod and the coil 3, which will therefore be most sensitive to any field linking the rod, as soon as tilt occurs. When it does, as exemplified by the tilted rod, the signal induced will be at a peak when the resultant field A is in the direction of tilt in the X-Z plane, which is represented by angle r. The phase of the coil 3 signal relative to the supply frequency at coil 1 will therefore give the direction of tilt in this plane.

FIG. 8 shows the same situation with coils 2 and 3 energized to produce resultant field B rotating about the X axis. This time the signal in coil 1 is sensed, which will have a phase relationship with the supply frequency defining the angle S to the axis of the rod in the Y-Z plane.

Similarly, FIG. 9 shows the effect of energizing coils 3 and 1 to produce resultant field C rotating about the Z axis, and sensing the coil 2 signal. Again the phase relative to the supply will define the angle t projected by the rod onto the X-Y plane.

So by sensing each plane in turn, the tilt of the transmitter relative to a gravitationally orientated body can be established in two planes related to the transmitter itself; any rotation of the transmitter in the horizontal plane would need to be established separately if of importance for a particular application.

While described as for a tilt-sensing application, it will be obvious that any gravity-related measurement will be effected by acceleration of the transmitter if in motion, so that the device may also be used as a directional accelerometer. Also, while the tilt-sensing embodiment has been described using a gimbal-mounted rod, other techniques may be used to avoid the use of mechanical bearings, e.g. by floating a layer of ferromagnetic fluid on another fluid of highly density in a spherical container, to provide a disc of ferromagnetic material in place of the rod, which will also produce signals varying in time phase to indicate tilt in a similar manner.

We claim:

1. An apparatus for determining the position and orientation of a remote object in relation to an observation point comprising transmitting means for sending a magnetic field signal, receiving means for receiving and analyzing said magnetic field signal, one of said means being positioned at said observation point and the other being secured on said remote object, said transmitting means comprising three coils positioned on a ferromagnetic core with their axes mutually orthogonal to each other, a two-phase power source connected separately to each of said coils and operable when energized to produce a magnetic field around the coils, electric means cooperable with said separate two-phase power sources for connecting said coils in pairs to produce a magnetic field rotating about the axis of the third coil, said receiving means comprising three coils positioned on a ferromagnetic core with their axes mutually orthogonal to each other and responsive to the magnetic field produced by said transmitting means, said receiving coils being connected in pairs to detect the phase relationship and magnitude of the signal induced by the transmitting coils to produce an electric signal indicative of the orientation of said remote body.

2. An apparatus according to claim 1 in which one of said transmitting means and receiving means comprises annular coils wound orthogonally on a homogeneous spherical ferromagnetic core.

3. An apparatus according to claim 1 in which one of said transmitting means and receiving means comprises annular coils wound orthogonally on a hollow cylindrical ferromagnetic core.

4. An apparatus according to claim 1 in which one of said transmitting means and receiving means comprises ferromagnetic rod core supported in a gimbal mounting with annular coils wound orthogonally thereon.

5. An apparatus according to claim 1 in which one of said transmitting means and receiving means comprises ferromagnetic disc core supported in a gimbal mounting with annular coils wound orthogonally thereon.

6. An apparatus according to claim 1 in which one of said transmitting means and receiving means comprises annular coils wound orthogonally on a homogeneous spherical ferromagnetic core, and the other of said transmitting means or receiving means comprises annular coils wound orthogonally on a hollow cylindrical ferromagnetic core.

7. An apparatus according to claim 1 in which said transmitting means and said receiving means each comprises annular coils wound orthogonally on a homogeneous spherical ferromagnetic core.

8. An apparatus according to claim 1 in which said transmitting means comprises annular coils wound orthogonally on a homogeneous spherical ferromagnetic core, and said receiving means comprises annular coils wound orthogonally on a hollow cylindrical ferromagnetic core.

9. An apparatus according to claim 1 including means to adjust one of said transmitting means or receiving means coils to produce a null point in the signal received by said receiving means whereupon the adjusted orientation corresponds to the orientation of the other coils.

10. An apparatus according to claim 1 including means to coordinate the measurement of magnetic field signals to determine the orientation and position of said remote object.

11. A system for drilling a bore hole comprising a boring tool having a longitudinal tool axis and including means for advancing the tool through the earth and steering means for directing the motion of the tool relative to its longitudinal axis, transmitting means for sending a magnetic field signal,
receiving means for receiving and analyzing said magnetic field signal,
one of said means being positioned at an observation point and the other being secured on said boring tool,
said transmitting means comprising three coils positioned on a ferromagnetic core with their axes mutually orthogonal to each other,
a polyphase power source connected separately to each of said coils and operable when energized to produce a magnetic field around the coils,
electric means for connecting said coils in pairs and cooperable with said separate power sources to produce a magnetic field rotating about the axis of the third coil,
said receiving means comprising three coils positioned on a ferromagnetic core with their axes mutually orthogonal to each other and responsive to the magnetic field produced by said transmitting means,
said receiving coils being connected in pairs to detect the phase relationship and magnitude of the signal induced by the transmitting coils to produce an electric signal indicative of the orientation of said boring tool and for operating said steering means to change the direction of movement of said boring tool.

12. A system of apparatus according to claim 11 in which one of said transmitting means and receiving means comprises annular coils wound orthogonally on a homogeneous spherical ferromagnetic core.

13. A system of apparatus according to claim 11 in which one of said transmitting means and receiving means comprises annular coils wound orthogonally on a hollow cylindrical ferromagnetic core.

14. A system of apparatus according to claim 11 in which one of said transmitting means and receiving means comprises ferromagnetic rod core supported in a gimbal mounting with annular coils wound orthogonally thereon.

15. A system of apparatus according to claim 11 in which one of said transmitting means and receiving means comprises ferromagnetic disc core supported in a gimbal mounting with annular coils wound orthogonally thereon.

16. A system of apparatus according to claim 11 in which one of said transmitting means and receiving means comprises annular coils wound orthogonally on a homogeneous spherical ferromagnetic core, and the other of said transmitting means and receiving means comprises annular coils wound orthogonally on a hollow cylindrical ferromagnetic core.

17. A system of apparatus according to claim 11 in which said transmitting means and said receiving means each comprises annular coils wound orthogonally on a homogeneous spherical ferromagnetic core.

18. A system of apparatus according to claim 11 in which said transmitting means comprises annular coils wound orthogonally on a homogeneous spherical ferromagnetic core, and said receiving means comprises annular coils wound orthogonally on a hollow cylindrical ferromagnetic core.

19. A system of apparatus according to claim 11 including means to adjust one of said transmitting means or receiving means coils to produce a null point in the signal received by said receiving means whereupon the adjusted orientation corresponds to the orientation of the other coils.

20. A system of apparatus according to claim 11 including means to coordinate the measurement of magnetic field signals to determine the orientation and position of said boring tool.

21. A method determining the orientation of a remote object comprising
   providing transmitting means for sending a magnetic field signal,
   providing receiving means for receiving and analyzing said magnetic field signal,
   one of said means being positioned at an observation point and the other being secured on said remote object,
   said transmitting means comprising three coils positioned on a ferromagnetic core with their axes mutually orthogonal to each other,
   connecting a two-phase power source separately to each of said coils,
   connecting said coils selectively in pairs and energizing selected pairs from said polyphase power source to produce a magnetic field rotating about the axis of the third coil without any physial movement of the coils,
   said receiving means comprising three coils positioned on a ferromagnetic core with their axes mutually orthogonal to each other and responsive to the magnetic field produced by said transmitting means, and
   connecting said receiving coils in pairs to detect the phase relationship and magnitude of the signal induced by the transmitting coils to produce an electric signal indicative of the orientation of said remote body.

22. A method according to claim 21 in which
   one of said transmitting means and receiving means comprises annular coils wound orthogonally on a homogeneous spherical ferromagnetic core.

23. A method according to claim 21 in which
   one of said transmitting means and receiving means comprises annular coils wound orthogonally on a hollow cylindrical ferromagnetic core.

24. A method according to claim 21 in which
   one of said transmitting means and receiving means comprises ferromagnetic rod core supported in a gimbal mounting with annular coils wound orthogonally thereon.

25. A method according to claim 21 in which
   one of said transmitting means and receiving means comprises ferromagnetic disc core supported in a gimbal mounting with annular coils wound orthogonally thereon.

26. A method according to claim 21 in which
   one of said transmitting means and receiving means comprises annular coils wound orthogonally on a homogeneous spherical ferromagnetic core, and
   the other of said transmitting means and receiving means comprises annular coils wound orthogonally on a hollow cylindrical ferromagnetic core.

27. A method according to claim 21 in which
   said transmitting means and said receiving means each comprises annular coils wound orthogonally on a homogeneous spherical ferromagnetic core.

28. A method according to claim 21 in which
   said transmitting means comprises annular coils wound orthogonally on a homogeneous spherical ferromagnetic core, and
   said receiving means comprises annular coils wound orthogonally on a hollow cylindrical ferromagnetic core.

29. A method according to claim 21 including
   means to adjust one of said transmitting means or receiving means coils to produce a null point in the signal received by said receiving means whereupon the adjusted orientation corresponds to the orientation of the other coils.

30. A method according to claim 21 including
   means to coordinate the measurement of magnetic field signals to determine the orientation and position of said remote object.

31. A method according to claim 21 in which
   said transmitting means coils are energized separately and successively with separate two-phase alternating current sources at the same frequency.

32. A method according to claim 21 in which
   said transmitting means coils are energized separately and simultaneously with separate two-phase alternating current sources at different frequencies.

33. A positional information system comprising
   a transmitter for producing a varying electromagnetic field having a set of coils with three mutually orthogonal axes,
   means for energizing said coils separately in pairs with polyphase alternating current in a phase relationship which generates a resultant field rotating about the axis of the other coil without mechanical movement of the coils,
   a receiver coil, and
   means for determining from the receiver coil the phase relationship of the induced signals to the transmitted signals, thereby providing an indication of the positional relationship between the receiver coil and the transmitter.

34. A system according to claim 33 in which
   there are three receiver coils in mutually orthogonal relationship, each coil contributing positional information derived from phase relationship.

35. A system according to claim 33 in which
   said transmitter coils are energized in pairs in sequence using the same frequency.

36. A system according to claim 34 in which
   said transmitter coils are energized in pairs in sequence using the same frequency.

37. A system according to claim 33 in which
   said transmitter coils are simultaneously energized in pairs with different frequencies.

38. A system according to claim 34 in which
   said transmitter coils are simultaneously energized in pairs with different frequencies.

39. A system according to claim 33 in which
   said coils are annular and wound on formers around a spherical ferromagnetic core.

40. A system according to claim 33 in which
   phase relationship determining means comprises means for determining from any coil the phase relationship of the induced signal to that energizing either of the other two coils, thereby providing an indication of the positional relationship between the receiver coil and the transmitter.

* * * * *